US009094865B2

(12) United States Patent
Draznin et al.

(10) Patent No.: US 9,094,865 B2
(45) Date of Patent: Jul. 28, 2015

(54) LOAD BALANCING FOR DEVICES WITHIN A NETWORK

(75) Inventors: Sagiv Draznin, Walnut Creek, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 416 days.

(21) Appl. No.: 13/567,156

(22) Filed: Aug. 6, 2012

(65) Prior Publication Data

US 2014/0036677 A1 Feb. 6, 2014

(51) Int. Cl.
*H04W 28/08* (2009.01)
*H04L 29/08* (2006.01)

(52) U.S. Cl.
CPC .............. *H04W 28/08* (2013.01); *H04L 67/101* (2013.01); *H04L 67/1012* (2013.01)

(58) Field of Classification Search
CPC .. H04L 67/101; H04L 67/1012; H04W 28/08
USPC ........................................................ 370/235
See application file for complete search history.

(56) References Cited

U.S. PATENT DOCUMENTS

2012/0236753 A1* 9/2012 Rados et al. ............... 370/253

\* cited by examiner

*Primary Examiner* — Jung Park
*Assistant Examiner* — Albert Shih

(57) ABSTRACT

A first device is configured to receive an instruction from a second device, identify network demand associated with the instruction, identify a third device associated with the instruction, send a first load query to the third device, and receive a first load response from the third device. The first load response may identify network capacity associated with the third device and may indicate that the third device is under-loaded, overloaded, or substantially overloaded. The first device is further configured to send a first portion of data, associated with the instruction from the second device, to the third device based on the network capacity indicating that the third device is under-loaded, and send a second portion of data, associated with the instruction from the second device, to a fourth device based on the network capacity indicating that the third device is under-loaded.

24 Claims, 7 Drawing Sheets

LOAD BALANCING FOR DEVICES WITHIN A NETWORK

BACKGROUND

Users sometimes use user devices to access a network to perform some task (e.g., place a telephone call, send and/or receive electronic messages (e-mails), access web pages on the internet, etc.). Devices, associated with the network, may communicate with each other to process data associated with performing the task. Communications between the devices, associated with the network, may cause some network devices to become overloaded while other network devices may be under-loaded.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide network load balancing across network nodes and/or devices associated with a network (e.g., servers, gateways, routers, switches, and/or some other device). For example, a user device may communicate with a sending device in order to perform a task (e.g., place a telephone call, send and/or receive electronic mail (e-mail), access web pages on the internet, etc.), based on receiving an instruction from a user, associated with the user device, to perform the task. The sending device may communicate with one or more receiving devices to process data, associated with the instruction, to perform the task via a network, such as a cellular network or some other network.

In some implementations, the instruction may include a demand for network resources, such as a quantity of sessions, a quantity of transactions per second, network bandwidth, and/or some other network resource. The sending device may send a load query to the one or more receiving devices to identify available network capacity associated with the receiving devices. The sending device may communicate with a receiving device based on receiving an indication, from the receiving device, that the receiving device has available network capacity to communicate with the sending device (e.g., to process the instruction to perform the task).

As a result, the sending device may communicate with receiving devices having available network capacity and may not communicate with receiving devices that may not have available network capacity, thereby preventing instances in which a receiving device becomes overloaded. In some implementations, a sending device may function as a receiving device, and a receiving device may function as a sending device. Further, a single device may function as both a sending device and a receiving device.

Figure 1:
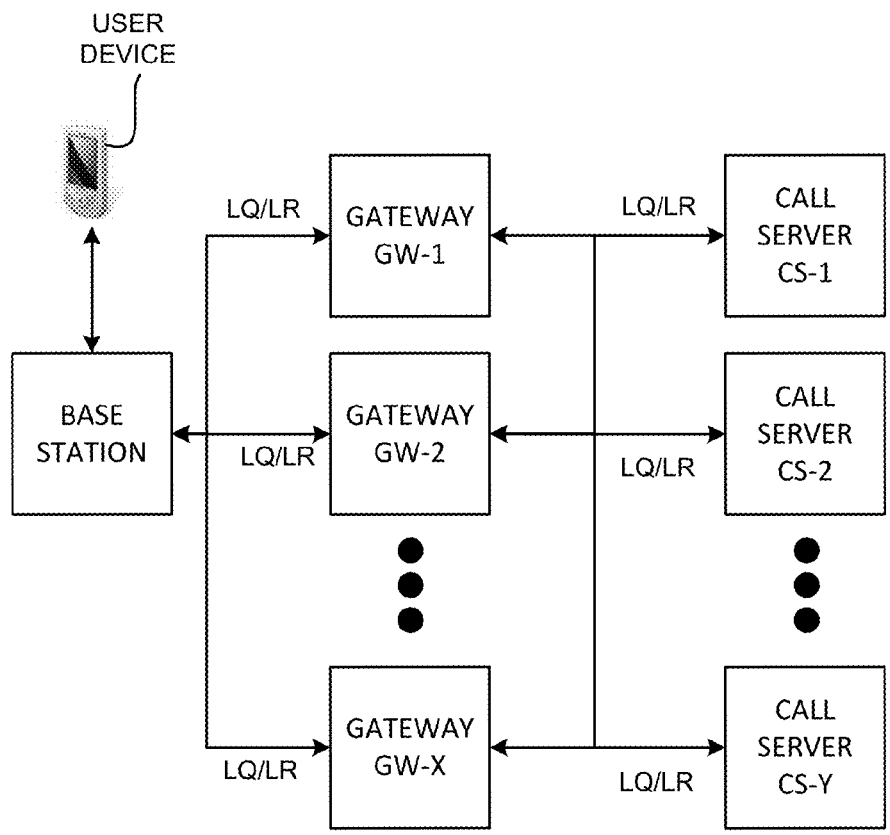
FIG. 1 illustrates an example overview of an implementation described herein.

FIG. 1 illustrates an example overview of an implementation described herein. In FIG. 1, assume that a user device communicates with one or more devices to perform some task, such as place a telephone call. The user device may communicate with a call server (e.g., to place the telephone call) via a base station, and/or a gateway. In some implementations, the base station may receive an instruction, from the user device, to place a call and may function as a sending device to transmit network data, associated with the instruction, to a gateway. The gateway may function as a receiving device to receive the network data, and may also function as a sending device to transmit the network data to a receiving device, such as a call server, (e.g., to allow the call server to place the call associated with the instruction).

As further shown in FIG. 1, the base station may transmit network data to a call server via one or more gateways (e.g., GW-1 through GW-X where X≥1) which may transmit network data to one or more call servers (e.g., CS-1 through CS-Y where Y≥1). In some implementations, the base station may identify which gateway(s) to which to transmit network data based on identifying which gateway(s) have available capacity to receive network data from the base station. The gateway(s) may identify which call server(s) to which to transmit network data based on identifying which call server (s) have available capacity to receive network data from the gateway(s). As a result, the base station may communicate with gateways having available network capacity and the gateways may communicate with call servers having available network capacity.

In some implementations, the base station may receive instructions, having demands for network resources, from a user device, such as instructions to place a telephone call, instructions to send data to a user device in the context of a user using the user device to access web pages on the internet, instructions to send and/or receive e-mail, etc. The base station may function as a sending device and may send a load query (shown as "LQ" in FIG. 1) to a receiving device, such as a gateway (e.g. GW-1) to identify whether the gateway has available network capacity to receive and/or process network data, associated with the instructions. GW-1 may send a load response (shown as "LR" in FIG. 1) to the base station to indicate whether GW-1 has capacity to receive and/or process network data. The base station may communicate with GW-1 based on receiving a load response from GW-1 in which the load response indicates that GW-1 has the capacity receive and/or process network data from the base station. Additionally, or alternatively, the base station may send a load query to a second gateway (e.g., GW-2) based receiving an indication (e.g., a load response) that GW-1 does not have the capacity to receive and/or process network data from the base station.

Additionally, or alternatively, the base station may communicate with GW-1 and may send a load query to GW-2 based on receiving an indication that GW-1 has capacity to receive and/or process some network data, but not all network data, from the base station. Additionally, or alternatively, the base station may communicate with GW-2 based on receiving an indication that GW-2 has the capacity to receive and/or process network data, and may communicate with GW-X based on sending a load query to a GW-X and receiving an indication that GW-X has the capacity to receive and/or process network data.

As further shown in FIG. 1, a gateway (e.g., GW-1) may act as a sending device and may transmit network data, to a receiving device, such as a call server (e.g., CS-1 through CS-Y). GW-1 may identify call servers having available network capacity based on sending load queries to call servers and receiving indications of call servers having available capacity to receive and/or process network data. As a result, GW-1 may communicate with call servers that have available capacity to receive and/or process network data, and may not communicate with call servers that do not have available capacity to receive and/or process network data. While the example shown in FIG. 1 includes a base station, gateways, and call servers, in practice, the functions, described above, may be performed by any network device.

Figure 2:
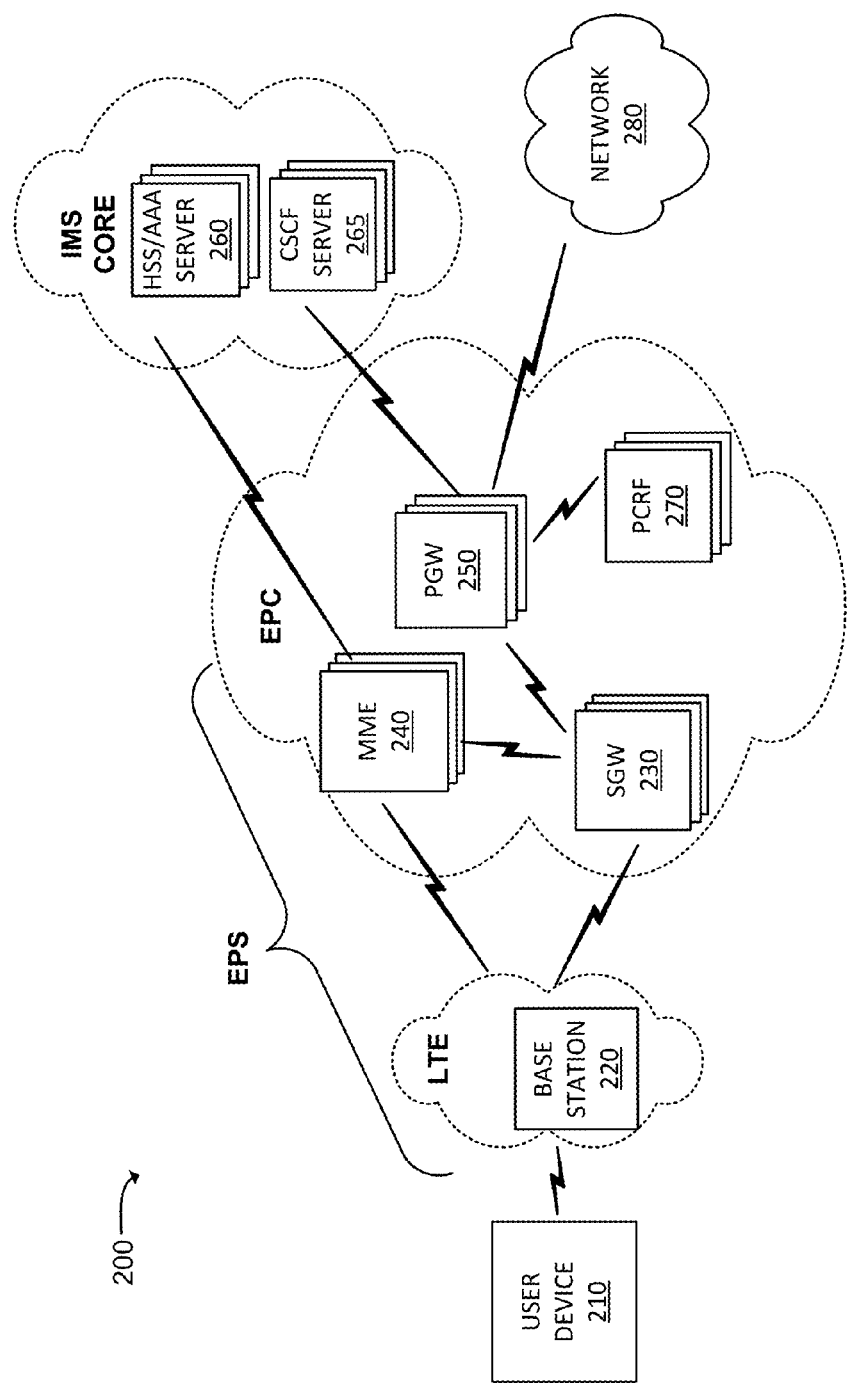
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, base station 220, serving gateway 230 (hereinafter referred to as "SGW 230"), mobility management entity device 240 (hereinafter referred to as "MME 240"), packet data network (PDN) gateway 250 (hereinafter referred to as "PGW 250"), home subscriber server (HSS)/authentication, authorization, accounting (AAA) server 260 (hereinafter referred to as "HSS/AAA server 260"), call session control function server 265 (hereinafter referred to as "CSCF server 265"), policy and charging rules function device 270 (hereinafter referred to as "PCRF 270"), and a network 280. The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

In some implementations, base station 220 may communicate with MME 240 over an S1-MME interface. Additionally, or alternatively, base station 220 may communicate with SGW 230 over an S1-4 interface. SGW 230 may communicate with PGW 250 over an S5 interface and PGW 250 may interface with PCRF 270 over a Gx interface. In some other implementations, base station 220, SGW 230, MME 240, PGW 250, and/or PCRF 270 may communicate with each other using some other interface or combination of interfaces.

Environment 200 may include an evolved packet system (EPS) having a long term evolution (LTE) network and/or an evolved packet core (EPC) that operates based on a third generation partnership project (3GPP) wireless communication standard. The LTE network may be a radio access network (RAN) that includes one or more base stations 220, such as eNodeBs (eNBs), via which user device 210 communicates with the EPC. The EPC may include SGW 230, MME 240, PGW 250, and/or PCRF 270 that enables user device 210 to communicate with network 280 and/or an Internet protocol (IP) multimedia subsystem (IMS) core. As shown in FIG. 2, the IMS core may include HSS/AAA server 260 and/or CSCF server 265. In some implementations, the IMS core may manage authentication, session initiation, account information, a user profile, etc. associated with user device 210. The LTE network may include multiple base stations 220, and the EPC may include multiple SGWs 230, MMEs 240, PGWs 250, and/or PCRFs 270. The IMS core may include multiple HSS/AAA servers 260 and/or CSCF servers 265.

User device 210 may include any portable or non-portable device capable of communicating via a network, such as network 280, a cellular network, an LTE network, or some other network. For example, user device 210 may correspond to a mobile communication device (e.g., a smart phone or a personal digital assistant (PDA)), a portable computer device (e.g., a laptop or a tablet computer), a non-portable computer device (e.g., a personal computer), a gaming device, a set-top box, or another type of device. In some implementations, user device 210 may communicate with HSS/AAA server 260, CSCF server 265 and/or network 280 to perform a task, such as placing a telephone call, sending and/or receiving e-mail, accessing web pages on the internet, etc., via base station 220, SGW 230, MME 240, PGW 250, and/or some other device.

Base station 220 may include one or more network devices, such as a router, a switch, an eNB device, or some other device. In some implementations, base station 220 may be part of the LTE network. Base station 220 may include a device that receives, processes, and/or transmits network data, such as audio, video, text, and/or other data, destined for and/or received from user device 210. Base station 220 may receive network data from and/or send data to network 280 via SGW 230 and PGW 250. Base station 220 may send network data to and/or receive data from user device 210 via a wired or wireless interface. One or more base stations 220 may be associated with a RAN, such as the LTE network.

In some implementations, base station 220 may function as a sending device to send network data (e.g., network data associated with an instruction to perform some task on behalf of user device 210, such as placing a telephone calling, sending and/or receiving e-mail, accessing web pages on the internet, etc.) to a receiving device, such as SGW 230 and/or PGW 250. Base station 220 may identify instances of SGW 230 and/or PGW 250 having available network capacity to receive network data based on sending load queries and receiving load responses. Additionally, or alternatively, base station 220 may function as a receiving device to receive network data from a sending device, such as SGW 230, MME 240, and/or some other device. Base station 220 may provide sending devices with a load response to indicate available network capacity associated with base station 220.

SGW 230 may include one or more network devices, or other types of computation or communication devices, that gather, process, search, store, and/or provide information in a manner described herein. SGW 230 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers network data. For example, SGW 230 may aggregate network data (e.g., network data associated with an instruction to perform some task on behalf of user device 210) received from one or more base stations 220 and may send the aggregated network data to network 280 via PGW 250. In one example implementation, SGW 230 may route and forward user data packets, may act as a mobility anchor for a user plane during inter-base station handovers, and may act as an anchor for mobility between LTE and other 3GPP technologies.

In some implementations, SGW 230 may function as a receiving device to receive network data from a sending device, such as base station 220 and/or some other sending device. SGW 230 may send the sending device a load response to indicate available network capacity associated with SGW 230. Additionally, or alternatively, SGW 230 may function as a sending device to send load queries to a receiving device, such as PGW 250 and/or some other receiving device. SGW 230 may send network data to the receiving device based on receiving an indication that the receiving device has available network capacity to receive and/or process network data.

MME 240 may include one or more network devices that gather, process, search, store, and/or provide information in a manner described herein. For example, MME 240 may perform operations associated with a handoff to and/or from the EPS. MME 240 may perform operations to register user device 210 with the EPS, to hand off user device 210 from the EPS to another network, to hand off a user device 210 from the other network to the EPS, and/or to perform other operations. MME 240 may perform policing operations for data destined for and/or received from user device 210.

In some implementations, MME 240 may function as a receiving device to receive network data from a sending device, such as base station 220 and/or some other sending device. MME 240 may provide the receiving device with a load response to indicate available network capacity associated with MME 240. Additionally, or alternatively, MME 240 may function as a sending device to send load queries to a receiving device, such as HSS/AAA server 260 and/or some other receiving device. MME 240 may send network data to the receiving device based on receiving an indication that the receiving device has available network capacity to receive network data.

PGW 250 may include one or more network devices that gather, process, search, store, and/or provide information in a manner described herein. PGW 250 may include one or more data processing and/or data transfer devices, such as a gateway, a router, a modem, a switch, a firewall, a NIC, a hub, a bridge, a proxy server, an OADM, or some other type of device that processes and/or transfers data. PGW 250 may, for example, provide connectivity of user device 210 to external packet data networks by being a data exit/entry point for user device 210. PGW 250 may perform policy enforcement, packet filtering, charging support, lawful intercept, and packet screening. PGW 250 may also act as an anchor for mobility between 3GPP and non-3GPP technologies. PGW 250 may authenticate user device 210 (e.g., via interaction with HSS/AAA server 260).

In some implementations, PGW 250 may function as a receiving device to receive network data from a sending device, such as SGW 230 and/or some other device. PGW 250 may provide the sending device with a load response to indicate available network capacity associated with PGW 250. Additionally, or alternatively, PGW 250 may function as a sending device to send load queries to a receiving device, such as CSCF server 265, PCRF 270, and/or some other device. PGW 250 may send network data to the receiving device based on receiving an indication that the receiving device has available network capacity to receive the network data.

HSS/AAA server 260 may include one or more network devices, or other types of computation or communication devices, that gather, process, search, store, and/or provide information in a manner described herein. For example, HSS/AAA server 260 may manage, authenticate, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

In some implementations, HSS/AAA server 260 may function as a receiving device to receive network data from a sending device, such as PGW 250, MME 240, and/or some other device. HSS/AAA server 260 may provide the sending device with a load response to indicate available network capacity associated with HSS/AAA server 260. Additionally, or alternatively, HSS/AAA server 260 may function as a sending device to send load queries to a receiving device, such as PGW 250, MME 240, and/or some other device. HSS/AAA server 260 may send network data to the receiving device based on receiving an indication that the receiving device has available network capacity to receive network data.

CSCF server 265 may include one or more network devices, or other types of computation or communication devices, that gather, process, search, store, and/or provide information in a manner described herein. CSCF server 265 may process and/or route calls to and from user device 210 via the EPC. For example, CSCF server 265 may process calls, received from network 280, that are destined for user device 210. In another example, CSCF server 265 may process calls, received from user device 210, that are destined for network 280.

In some implementations, CSCF server 265 may function as a receiving device to receive network data from a sending device, such as PGW 250, MME 240, and/or some other device. CSCF server 265 may provide the sending device with a load response to indicate available network capacity associated with CSCF server 265. Additionally, or alternatively, CSCF server 265 may function as a sending device to send load queries to a receiving device, such as PGW 250, MME 240, and/or some other device. CSCF server 265 may send network data to the receiving device based on receiving an indication that the receiving device has available network capacity to receive network data.

PCRF 270 may include one or more network devices, or other types of computation or communication devices, that gather, process, search, and/or provide information in a manner described herein. PCRF 270 may also store subscriber information, such as voice call and data rate plans or quotas for subscribers associated with user device 210. PCRF 270 may provide network control regarding service data flow detection, gating, Quality of Service (QoS), and/or flow based charging. Policies and rules regarding QoS may include policies and rules instructing user device 210 and network elements (base station 220, SGW 230, MME 240, PGW 250, etc.) to minimize packet loss, to implement a packet delay budget, to provide a guaranteed bit rate (GBR), to provide low latency, and/or to perform other activities associated with QoS. PCRF 270 may provide policies and rules to other network devices, such as HSS/AAAS server 260 and/or PGW 250, to implement network control. PCRF 270 may determine how a certain service data flow shall be treated, and may ensure that user plane data mapping and QoS is in accordance with a user's profile and/or network policies.

In some implementations, PCRF 270 may function as a receiving device to receive network data from a sending device, such as PGW 250 and/or some other device. PCRF 270 may provide the sending device with a load response to indicate available network capacity associated with PCRF 270. Additionally, or alternatively, PCRF 270 may function as a sending device to send load queries to a receiving device, such as PGW 250 and/or some other device. PCRF 270 may send network data to the receiving device based on receiving an indication that the receiving device has available network capacity to receive network data.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PTSSN)), an ad hoc network, a managed IP network, a virtual private network (VPN), an intranet, the Internet, a fiber optic-based network, and/or combination of these or other types of networks.

Figure 3:
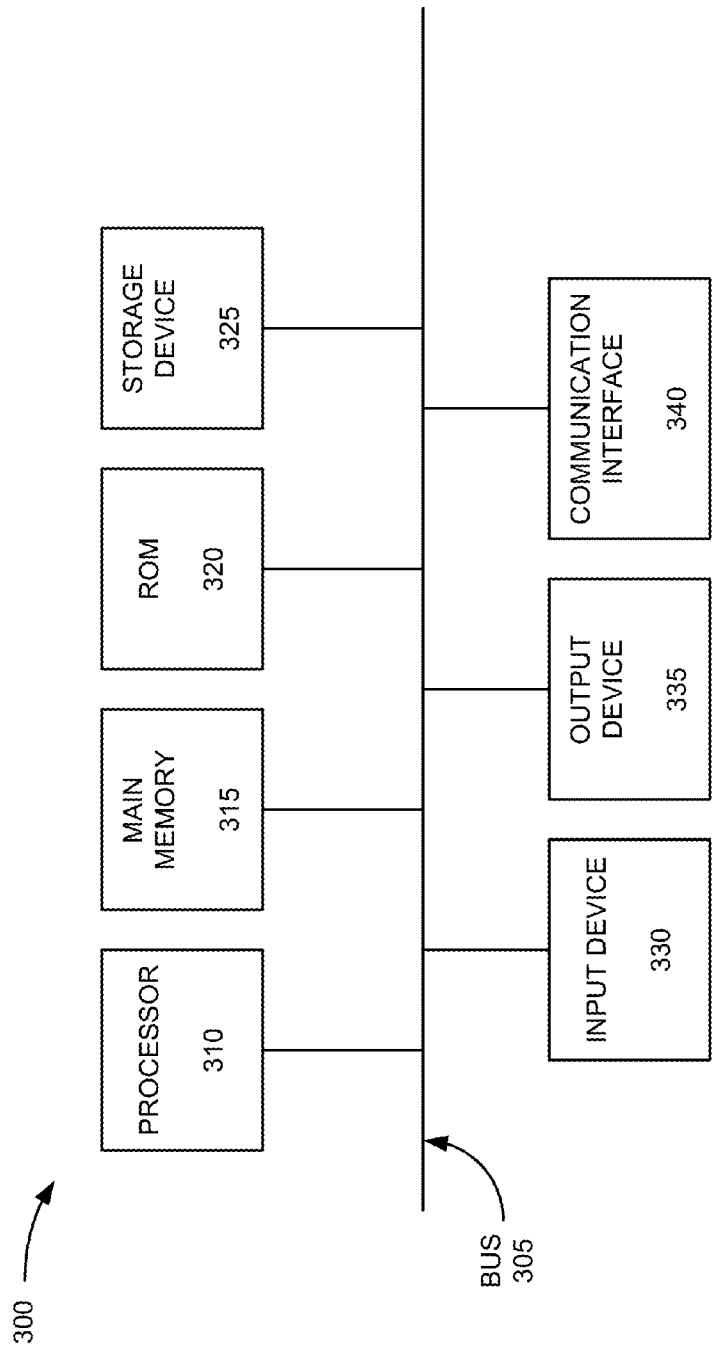
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, HSS/AAA server 260, CSCF server 265, and/or PCRF 270. Each of user device 210, base station 220, SGW 230, MME 240, PGW 250, HSS/AAA server 260, CSCF server 265, and/or PCRF device 270 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
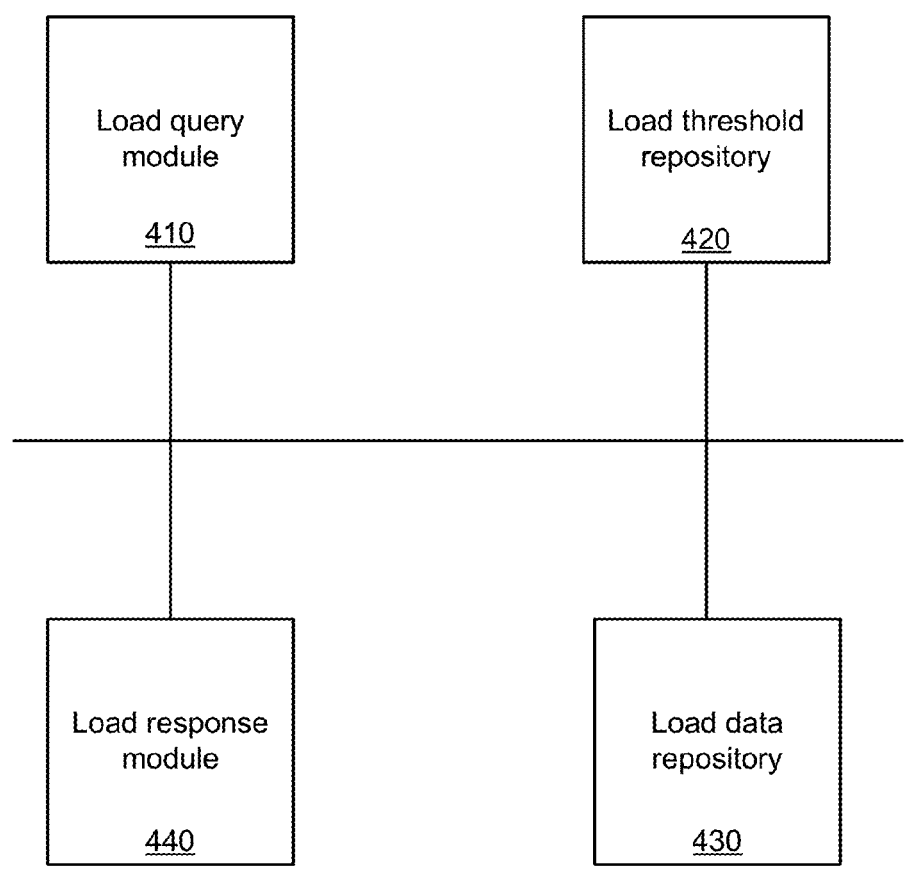
FIG. 4 illustrates example functional components of an example system.

FIG. 4 illustrates example functional components of an example system 400. In some implementations, system 400 may include functional components implemented by a device, such as base station 220. In some other implementation, system 400 may include functional components implemented by one or more devices, which include or exclude base station 220. For example, SGW 230, MME 240, PGW 250, HSS/AAA server 260, CSCF server 265, and/or PCRF 270 may include some or all of the functional components of system 400.

As shown in FIG. 4, system 400 may include load query module 410, load threshold repository 420, load data repository 430, and/or load response module 440.

In some implementations, load query module 410 may receive an instruction to communicate with a receiving device, (e.g., one or more of SGW 230, MME 240, PGW 250, HSS/AAA server 260, CSCF server 265, and/or PCRF 270) in order to perform a task, such as setting up a telephone call between user devices 210. For example, assume that a first user device 210 (e.g., UD-1) receives an instruction (e.g., from a user, associated with UD-1) to place a telephone call to a second user device 210 (e.g., UD-2). Load query module 410 may receive the instruction from UD-1 and may communicate with a receiving device, (e.g., one or more of SGW 230, MME 240, PGW 250, HSS/AAA server 260, CSCF server 265, and/or PCRF 270) in order to process network data associated with the instruction to place the telephone call between UD-1 and UD-2. In some implementations, load query module 410 may send a load query to the receiving device to identify available network capacity for network resources associated with the receiving device.

Load threshold repository 420 may store indicators and thresholds, associated with the indicators, to identify available network capacity associated with a device. For example, load threshold repository 420 may store indicators, such as a data rate, a quantity of sessions, transactions per second, and/or some other indicator to identify available network capacity for the device associated with load threshold repository 420. Load threshold repository 420 may also store one or more thresholds, associated with each indicator. In some implementations, an indicator may relate to a network resource type, and a threshold may relate to available network capacity for a corresponding network resource type. For example, load threshold repository 420 may store an indicator (e.g., a quantity of sessions), and a threshold (e.g., less than 15 million) associated with the indicator to identify available network capacity for the particular network resource type associated with the indicator.

Load data repository 430 may store data associated with indicators and thresholds stored by load threshold repository 420. Information stored by load data repository 430 may relate to current load data for a network resource associated with an indicator. For example, load data repository 430 may store load data (e.g., a quantity, such as 10 million), associated with an indicator (e.g., a quantity of sessions), and a threshold (e.g., less than 15 million) associated with the indicator.

Load response module 440 may determine available network capacity and may generate a response based on information stored by load threshold repository 420 and load data repository 430. For example, assume that load threshold repository 420 stores an indicator relating to a network resource type (e.g., a quantity of sessions), a first threshold (e.g., less than 15 million), and a second threshold (e.g., less than 20 million) associated with the indicator. Further assume that load data repository 430 stores load data (e.g., a quantity, such as 13 million), associated with the indicator and the thresholds. Load response module 440 may identify that the load data satisfies the first threshold (e.g., since 13 million is less than 15 million) and may generate a response (e.g., "accept") to indicate that the device, associated with load response module 440, includes available network capacity based on identifying that the load data satisfies the first threshold.

Further, the "accept" response may include a response value to indicate an amount of available network capacity for a network resource (e.g. a value of 2 million network transactions). Load response module 440 may receive a load query from a sending device, and send the load response to the sending device, based on the sending device sending the load query to load response module 440. In some implementations, the sending device may send network data to the device associated with load response module 440 (e.g., CSCF server 265).

In the example described above, the sending device may send network data corresponding to the available network capacity (e.g., 2 million network transactions). In some implementations, the sending device may demand network capacity greater than what is available from the receiving device. In this case, the sending device may send some network data to the receiving device, and may send a load query to other receiving devices to identify receiving devices having available network capacity to receive network data from the sending device.

In some other implementations, assume that load threshold repository 420 stores an indicator (e.g., a quantity of transactions per second), a first threshold (e.g., less than 5 million), and a second threshold (e.g., less than 6 million) associated with the indicator. Further assume that load data repository 430 stores load data (e.g., a quantity, such as 5.5 million), associated with the indicator and the thresholds. Load response module 440 may identify that the load data satisfies the second threshold (e.g., since 5.5 million is less than 6 million), but does not satisfy the first threshold (e.g., since 5.5 million is greater than 6 million). Load response module 440 may generate a response (e.g., "pending") to indicate that the device, associated with load response module 440, does not include available network capacity based on identifying that the load data does not satisfy the first threshold but satisfies the second threshold.

The "pending" response may also include an instruction to cause the sending device to resend the load query to the device associated with load response module 440, after a particular time period, based on identifying that the data satisfies the second threshold but not the first threshold. In some implementations, the instruction to resend the load query may relate to when the device, associated with load response module 440, does not currently have available network capacity for a network resource type, but may have available network capacity within a particular time period.

In some other implementations, assume that load threshold repository 420 stores an indicator relating to a network resource type (e.g., a data rate), a first threshold (e.g., less than 100 gigabits per second (Gbps)), and a second threshold (e.g., less than 110 Gbps) associated with the indicator. Further assume that load data repository 430 stores load data (e.g., a quantity of 120 Gbps), associated with the indicator and the thresholds. Load response module 440 may identify that the load data does not satisfy the first threshold or the second threshold and may generate a response (e.g., "reject") to indicate that the device, associated with load response module 440, does not include available network capacity. Load response module 440 may send the response to the sending device such that the sending device may send a load query to some other receiving devices to identify receiving devices having available network capacity.

Figure 5:
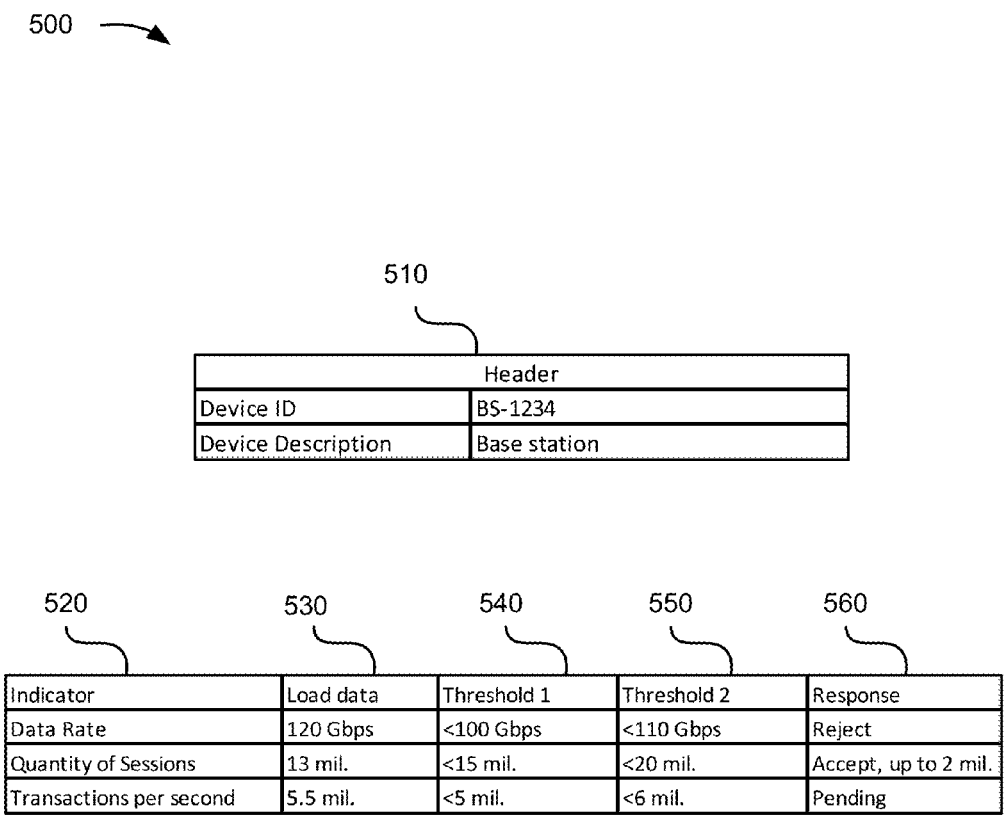
FIG. 5 illustrates an example data structure that may be stored by one or more devices in the environment of FIG. 2, such as a call session control function server.

FIG. 5 illustrates an example data structure 500 that may be stored by one or more devices in environment 200, such as base station 220. In one implementation, data structure 500 may be stored in a memory of base station 220. In another implementation, data structure 500 may be stored in a memory separate from, but accessible by base station 220. In some implementations, data structure 500 may be stored by some other device in environment 200, such as SGW 230, MME 240, PGW 250, HSS/AAA server 260, CSCF server 265, and/or PCRF 270.

A particular instance of data structure 500 may contain different information and/or fields than another instance of data structure 500. In some implementations, data structure 500 may correspond to information stored by load threshold repository 420 and/or load data repository 430. One instance of data structure 500 may store indicators, thresholds, and/or load data associated with one device in environment 200, whereas another instance of data structure 500 may store indicators, thresholds, and/or load data associated with some other device in environment 200.

As shown in FIG. 5, data structure 500 may include header field 510, indicator field 520, load data field 530, threshold 1 field 540, threshold 2 field 550, and/or response field 560. In some implementations, data structure 500 may include additional fields, fewer fields, different fields, or differently arranged fields than are shown in FIG. 5.

Header field 510 may store information to identify a particular device of environment 200 with which data structure 500 is associated. For example, header field 510 may store a device identifier (ID), such as BS-1234 to identify the type of device associated with data structure 500 (e.g., base station 220). Header field 510 may further store a device description, such as "Base station" to identify a description of the device type associated with data structure 500. While a particular format of data stored by header field 510 is shown, in practice, it will be apparent that header field 510 may store any information in any format to identify a device with which a particular instance of data structure 500 is associated. In the example shown in FIG. 5, one particular instance of data structure 500 may be associated with base station 220.

Indicator field 520 may store information to identify indicators with which the device of data structure 500 is associated. For example, indicator field 520 may store types of network resources (e.g., data rates, a quantity of sessions, or transactions per second) associated with the device of data structure 500. As described below, indicator field 520 may correspond to thresholds, associated with each indicator, to identify available network capacity by network resource type associated with the device of data structure 500.

Load data field 530 may store data identifying current network load for a particular network resource type. For example, load data field 530 may store the value 120 Gbps to identify the network load, associated with the data rate network resource type. In some implementations, information stored by load data field 530 may correspond with information stored by load data repository 430.

Threshold 1 field 540 may store data identifying a threshold relating to available network capacity for a particular network resource type. For example, threshold 1 field may store a threshold of less than 100 Gbps to identify that the maximum network capacity for the data rate network resource type is 100 Gbps. Data stored by threshold 1 field 540 may also relate to when a network resource is considered to be overloaded. While specific examples of values for thresholds stored by threshold 1 field 540 are shown in FIG. 5, in practice, it will be apparent that threshold 1 field 540 may store any value.

Threshold 2 field 550 may store data identifying a threshold relating to when a network resource is considered to be substantially overloaded. While specific examples of values for thresholds stored by threshold 2 field 550 are shown in FIG. 5, in practice, it will be apparent that threshold 2 field 550 may store any value that is greater than the value stored by threshold 1 field 540.

Response field 560 may store load responses by network resource types based on information stored by load data field 530, threshold 1 field 540, and/or threshold 2 field 550. For example, response field 560 may store load responses based on load response module 440 generating a load response as described above. In one example implementation, response field 560 may store the response "accept, up to 2 mil." for the quantity of sessions network resource type (e.g., when the load data is 13 million vs. threshold 1 of less than 15 million). In this example implementation, a sending device may send network data having network demand of <2 million sessions.

In some other example implementations, response field 560 may store the response "pending" when data stored by load data field 530 satisfies the threshold stored by threshold 1 field 540 but does not satisfy the threshold stored by threshold 2 field 550. In some implementations, the "pending" response may relate to a situation in which a network resource type may not currently have available network capacity, but may have available network capacity within a particular time period.

In another example implementation, response field 560 may store the response "reject" when data stored by load data field 530 does not satisfy the threshold stored by threshold 1 field 540 and does not satisfy the threshold stored by threshold 2 field 550. In some implementations, the "reject" response may relate to a situation in which a network resource type is considered to be substantially overloaded.

Figure 6:
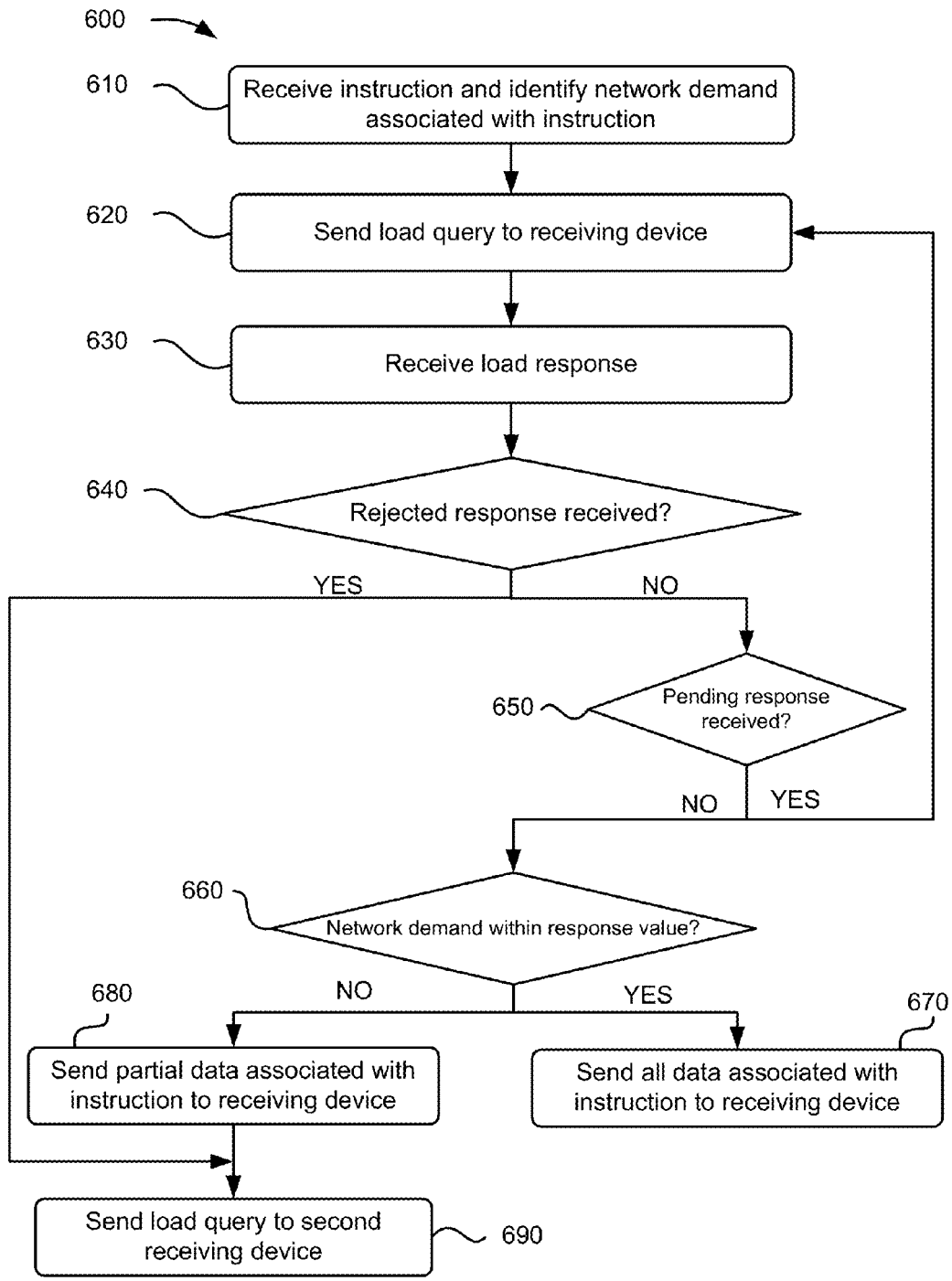
FIG. 6 illustrates a flowchart of an example process for balancing network load.

FIG. 6 illustrates a flowchart of an example process 600 for balancing network load. In one implementation, process 600 may be performed by one or more components of a sending device, such as base station 220. In another implementation, some or all of blocks of process 600 may be performed by one or more components of another sending device (e.g., SGW 230, MME 240, PGW 250, HSS/AAA server 260, CSCF server 265, and/or PCRF 270), or a group of devices including or excluding base station 220.

Process 600 may include receiving an instruction and identifying network demand associated with the instruction (block 610). For example, base station 220 may receive an instruction from user device 210 to allow user device 210 to perform some task (e.g., place a telephone call, send and/or receive e-mail, access web pages on the internet, etc.) by communicating with a SGW 230, MME 240, PGW 250, HSS/AAA server 260, CSCF server 265, PCRF 270, and/or network 280. Base station 220 may also determine network demand for network resources associated with the instruction.

In a particular example, base station 220 may identify that an instruction to allow user device 210 to access web pages on the internet may include a demand of 10 Gbps for the data rate network resource type, a demand of 20 sessions for the quantity of sessions network resource type, and/or a demand of 100 transactions per second for the transactions per second network resource type. Additionally, base station 220 may identify a receiving device (e.g., SGW 230) to receive the task instruction in order to perform the task.

Process 600 may further include sending a load query to a receiving device (block 620). For example, as described above with respect to load query module 410, base station 220 may send a load query to a receiving device (e.g., SGW 230) to identify available network capacity for network resources associated with the receiving device and to identify a receiving device that has available network capacity to receive and/or process a task instruction.

Process 600 may further include receiving a load response (block 630). For example, as described above with respect to load response module 440, base station 220 may receive a load response from a receiving device (e.g., SGW 230) based on base station 220 sending a load query to the receiving device.

Process 600 may also include identifying whether a "rejected" load response has been received (block 640). For example, base station 220 may identify whether a "rejected" load response has been received based on receiving a load response from a receiving device (e.g., SGW 230).

If, for example, a "rejected" load response is not received (block 640—NO), process 600 may include determining whether a "pending" load response has been received (block 650). For example, base station 220 may determine whether a "pending" load response has been received based on receiving the load response.

If, for example, a "pending" load response is received, process 600 may include sending a load query to a receiving device (block 620). For example, the "pending" response may include instructions to cause base station 220 to send a load query to the receiving device that sent the load response after a particular period of time. As described above, the "pending" load response may relate to a situation in which the receiving device does not currently have available network capacity, but may have available network capacity within a particular time period.

If, on the other hand, a "pending" load response (block 650—NO) is not received, process 600 may include determining whether the network demand (i.e., the network demand associated with the instruction) is within the response value (block 660). For example, as described above, base station 220 may receive an "accept" load response which includes a response value to indicate an amount of available network capacity for a network resource. Base station 220 may identify whether the network demand for a network resource, associated with the task instruction, is within the response value associated with the "accept" response.

If, for example, the network demand is within the response value (block 660—YES), process 600 may include sending all data, associated with the instruction, to the receiving device (block 670). As a result, the receiving device may receive data, associated with the instruction, when the receiving device has available network capacity to receive data associated with the instruction and may not receive data when receiving device may not have available network capacity to receive the data.

If, on the other hand, the network demand is not within the response value (block 660—NO), process 600 may also include sending partial data, associated with the instruction, to the receiving device (block 680). For example, assume that the response value for the "quantity of sessions" network resource type is 2 million, thereby indicating that the receiving device has available network capacity to handle 2 million additional sessions. Further assume that the network demand for the "quantity of sessions" network resource type for the instruction is 3 million sessions. Base station 220 may send some data to the receiving device such that the receiving device receives data corresponding to available network capacity.

Process 600 may further include sending a load query to a second receiver device—e.g., another instance of SGW 230 (block 690). For example, base station 220 may send a load query to a second receiving device in a similar manner as described above with respect to block 620. In some implementations, base station 220 may send the load query to the second receiving device to identify available network capacity associated with the second receiving device. Block 690 may initiate second instances of blocks 620-680 in order to identify available network capacity associated with any number of receiving devices.

If a rejected load response is received (block 640—YES), process 600 may include sending a load query to a second receiving device (block 690), as described above.

While an example of process 600 is described in terms of a receiving device as base station 220 and a sending device as SGW 230, in practice, it will be apparent that any of the devices in environment 200 may function as a sending device, a receiving device, or a combination of a sending device and a receiving device.

Figure 7:
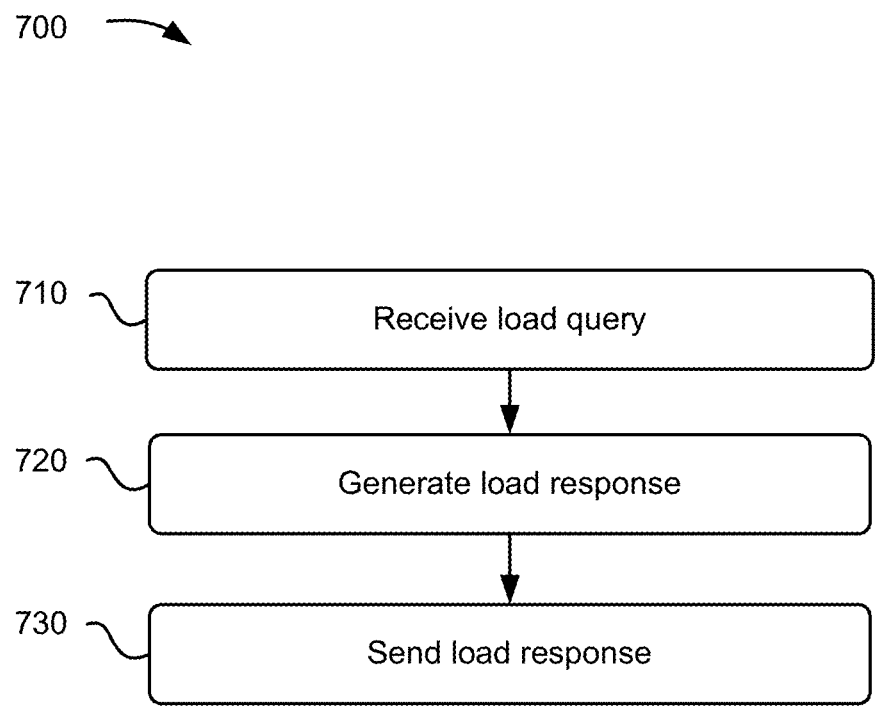
FIG. 7 illustrates a flowchart of an example process for balancing network load.

FIG. 7 illustrates a flowchart of an example process 700 for balancing network load. In one implementation, process 700 may be performed by one or more components of a receiving device, such as base station 220. In another implementation, one or more blocks of process 700 may be performed by one or more components of another receiving device (e.g., SGW 230, MME 240, PGW 250, HSS/AAA server 260, CSCF server 265, and/or PCRF 270), or a group of devices including or excluding base station 220.

Process 700 may include receiving a load query (block 710). For example, base station 220 may receive a load query from a sending device (e.g., SGW 230) to allow the sending device to identify available network capacity associated with the base station (e.g., in a similar manner as described above).

Process 700 may also include generating a load response (block 720). For example, as described above with respect to load response module 440, base station 220 may determine available network capacity and may generate a response based on information stored by load threshold repository 420 and load data repository 430.

Process 700 may further include sending the load response (block 730). For example, base station 220 may send the load response to the sending device (e.g., SGW 230) based on generating the load response as described above.

While an example of process 700 is described in terms of a receiving device as base station 220 and a sending device as SGW 230, in practice, it will be apparent that any of the devices in environment 200 may function as a sending device, a receiving device, or a combination of a sending device and a receiving device.

As described above, process 600 and process 700 may allow a sending device to identify receiving devices having available network capacity. The sending devices may communicate with receiving devices having available network capacity and may not communicate with receiving devices that may not have available network capacity, thereby preventing instances in which a receiving device becomes overloaded.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIGS. 6-7, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first device, an instruction from a second device;
   identifying, by the first device, network demand associated with the instruction;
   identifying, by the first device, a third device associated with the instruction;
   sending, by the first device, a first load query to the third device;
   receiving, by the first device and based on sending the first load query, a first load response from the third device,
      the first load response identifying network capacity associated with the third device,
      the network capacity, associated with the third device, indicating that the third device is under-loaded, overloaded, or substantially overloaded;
   sending, by the first device, a first portion of data, associated with the instruction from the second device, to the third device based on the network capacity indicating that the third device is under-loaded; and
   sending, by the first device, a second portion of data, associated with the instruction from the second device, to a fourth device based on the network capacity indicating that the third device is under-loaded.

2. The method of claim 1, further comprising:
resending the first load query to the third device after a particular time period, based on the network capacity indicating that the third device is overloaded.

3. The method of claim 1, further comprising:
sending a second load query to a fifth device based on the network capacity indicating that the third device is substantially overloaded.

4. The method of claim 1, further comprising:
receiving a response threshold relating to the network capacity; and
determining whether the network demand, associated with the instruction from the second device, is within the response threshold,
where sending the first portion of data, associated with the instruction from the second device is based on determining that the network demand is not within the response threshold, and
where sending the second portion of data, associated with the instruction from the second device, is based on determining that the network demand is not within the response threshold.

5. The method of claim 4, further comprising:
sending the first portion of the data and sending the second portion of the data to the third device based on determining that the network demand is within the response threshold.

6. The method of claim 1, where sending the second portion of data to the fourth device includes:
sending a second load query to the fourth device;
receiving a second load response from the fourth device based on sending the second load query to the fourth device,
the second load response identifying network capacity associated with the fourth device,
the network capacity, associated with the fourth device, indicating that the fourth device is under-loaded, overloaded, or substantially overloaded; and
sending the second portion of data to the fourth device based on the network capacity of the fourth device indicating that the fourth device is under-loaded.

7. The method of claim 1, further comprising:
receiving, by the third device, a first threshold and a second threshold,
the second threshold being greater than the first threshold;
receiving, by the third device, load data,
the load data relating to the network capacity associated with the third device;
generating, by the third device, the first load response based on the load data, the first threshold, and the second threshold,
receiving, by the third device, the first load query from the first device; and
sending, by the third device, the first load response to the first device based on receiving the first load query from the first device,
where receiving, by the first device, the first load response from the third device is based on the third device sending the first load response to the first device.

8. The method of claim 1, where the first device, the second device, the third device, and the fourth device are network devices associated with a long term evolution (LTE) network.

9. A system comprising:
a first device to:
receive an instruction from a second device;
identify network demand associated with the instruction;
identify a third device associated with the instruction;
send a first load query to the third device;
receive a first load response from the third device based on sending the first load query,
the first load response identifying network capacity associated with the third device,
the network capacity, associated with the third device, indicating that the third device is under-loaded, overloaded, or substantially overloaded;
send a first portion of data, associated with the instruction from the second device, to the third device when the network capacity indicates that the third device is under-loaded; and
send a second portion of data, associated with the instruction from the second device, to a fourth device when the network capacity indicates that the third device is under-loaded.

10. The system of claim 9, where the first device is further to:
send a second load query to a fifth device when the network capacity indicates that the third device is substantially overloaded.

11. The system of claim 9, where the first device is further to:
receive a response threshold relating to the network capacity when the network capacity indicates that the third device is under-loaded;
determine whether the network demand, associated with the instruction from the second device, is within the response threshold;
the first portion of data, associated with the instruction from the second device, being sent to the third device based on determining that the network demand is not within the response threshold; and
the second portion of data, associated with the instruction from the second device, being sent to the fourth device based on determining that the network demand is not within the response threshold.

12. The system of claim 11, where the first device is further to:
send the first portion of the data and send the second portion of the data to the third device based on determining that the network demand is within the response threshold.

13. The system of claim 11, where the first device is further to:
send a second load query to the fourth device; and
receive a second load response from the fourth device based on sending the second load query to the fourth device,
the second load response identifying network capacity associated with the fourth device,
the network capacity, associated with the fourth device, indicating that the fourth device is under-loaded, overloaded, or substantially overloaded,
where the second portion of data, associated with the instruction from the second device, is sent to the fourth device based on the network capacity associated with the fourth device indicating that the fourth device is under-loaded.

14. The system of claim 9, where the first device, the second device, and the third device are network devices associated with a long term evolution (LTE) network.

15. A non-transitory computer-readable medium storing instructions, the instructions comprising:
a plurality of instructions, which, when executed by one or more processors associated with a first device, cause the one or more processors to:
receive an instruction from a second device;
identify network demand associated with the instruction;
identify a third device associated with the instruction;
send a first load query to the third device;
receive a first load response from the third device based on sending the first load query,
the first load response identifying network capacity associated with the third device,
the network capacity, associated with the third device, indicating that the third device is under-loaded, overloaded, or substantially overloaded;
send a first portion of data, associated with the instruction from the second device, to the third device when the network capacity indicates that the third device is under-loaded;
send a second portion of data, associated with the instruction from the second device, to a fourth device when the network capacity indicates that the third device is under-loaded; and
resend the first load query to the third device a particular amount of time after receiving the first load response, when the network capacity indicates that the third device is overloaded.

16. The non-transitory computer-readable medium of claim 15, where the plurality of instructions further cause the one or more processors to:
receive a response threshold relating to the network capacity based on the network capacity indicating that the third device is under-loaded; and
determine whether the network demand, associated with the instruction from the second device, is within the response threshold,
where the first portion of data, associated with the instruction from the second device, and the second portion of data, associated with the instruction from the second device, are sent based on determining that the network demand is not within the response threshold.

17. The non-transitory computer-readable medium of claim 16, where the plurality of instructions further cause the one or more processors to:
send the first portion of the data and send the second portion of the data to the third device based on determining that the network demand is within the response threshold.

18. The non-transitory computer-readable medium of claim 15, where one or more instructions, of the plurality of instructions, to send the second portion of data, associated with the instruction from the second device, to the fourth device cause the one or more processors to:
send a second load query to the fourth device;
receive a second load response from the fourth device based on sending the second load query to the fourth device,
the second load response identifying network capacity associated with the fourth device,
the network capacity, associated with the fourth device, indicating that the fourth device is under-loaded, overloaded, or substantially overloaded; and
send the second portion of data, associated with the instruction from the second device, to the fourth device based on the network capacity of the fourth device indicating that the fourth device is under-loaded.

19. The non-transitory computer-readable medium of claim 15, where the first device, the second device, the third device, and the fourth device are network devices associated with a long term evolution (LTE) network.

20. A method comprising:
receiving, by a first device, a first threshold and a second threshold;
receiving, by the first device, load data,
the load data relating to network load associated with the first device;
generating, by the first device, a load response based on the load data, the first threshold, and the second threshold, the second threshold being greater than the first threshold;
receiving, by the first device, a first load query from a second device;
sending, by the first device, the load response to the second device based on receiving the first load query from the second device; and
receiving, by the first device, network data from the second device based on sending the load response.

21. The method of claim 20, where generating the load response includes:
generating a first load response based on identifying that the load data does not satisfy the first threshold or the second threshold,
the first response causing the second device to send a second load query to a third device;
generating a second load response based on identifying that the load data satisfies the first threshold and does not satisfy the second threshold,
the second response causing the second device to resend the first load query to the first server; or
generating a third load response based on identifying that the load data satisfies the first threshold and satisfies the second threshold,
the third response causing the second device to send the network data,
the network data relating to the first load query.

22. The method of claim 20, where the first device and the second device are network devices associated with a long term evolution (LTE) network.

23. A system comprising:
a first device to:
receive a first threshold and a second threshold;
receive load data,
the load data relating to network load associated with the first device;
generate a load response based on the load data, the first threshold, and the second threshold,
the second threshold being greater than the first threshold;
receive a first load query from a second device;
send the load response to the second device based on receiving the first load query from the second device; and
receive, from the second device, network data based on sending the load response,
the first device and the second device being network devices associated with a long term evolution (LTE) network.

24. The system of claim 23, where when generating the load response, the first device is further to:

generate a first load response based on identifying that the
   load data does not satisfy the first threshold or the second
   threshold,
   the first response causing the second device to send a
      second load query to a third device;
generate a second load response based on identifying that
   the load data satisfies the first threshold and does not
   satisfy the second threshold,
   the second response causing the second device to resend
      the first load query to the first server; or
generate a third load response based on identifying that the
   load data satisfies the first threshold and satisfies the
   second threshold,
   the third response causing the second device to send the
      network data,
      the network data relating to the first load query.

* * * * *